United States Patent [19]

Davies et al.

[11] 3,938,635

[45] Feb. 17, 1976

[54] DRIVEN PLATES FOR FRICTION CLUTCHES

[75] Inventors: David Aubrey Davies; Dennis Sydney Johnson, both of Leamington Spa, England

[73] Assignee: Automotive Products Co., Ltd., Leamington Spa, England

[22] Filed: Feb. 11, 1974

[21] Appl. No.: 441,622

[30] Foreign Application Priority Data

Feb. 21, 1973  United Kingdom.................. 8516/73

[52] U.S. Cl.............................. 192/106.2; 403/359
[51] Int. Cl.² ........................................... F16D 3/14
[58] Field of Search...................... 192/106.1, 106.2

[56] References Cited

UNITED STATES PATENTS

| 1,952,892 | 3/1934 | Reed................ | 192/106.2 |
| 2,158,244 | 5/1939 | Mistretta et al. ................ | 192/106.2 |
| 2,294,638 | 9/1942 | Tower............................ | 192/106.2 |

FOREIGN PATENTS OR APPLICATIONS

| 422,418 | 1/1935 | United Kingdom.............. | 192/106.1 |
| 459,641 | 9/1949 | Canada........................... | 192/106.2 |

*Primary Examiner*—Benjamin W. Wyche
*Attorney, Agent, or Firm*—Lawrence J. Winter

[57] ABSTRACT

A clutch driven plate having an annular component which carries the friction facings and which is mounted for limited rotary movement on a hub so that it extends between a pair of radially extending discs which are fixed to the hub. One or both discs have integral bent-over tongues which project into corresponding circumferentially extending slots in the annular component and serve as stops which limit the rotary movement of the annular component relative to the hub. Also at least one of the discs is fixed in relation to the hub by engagement in grooves formed in the hub of serrations formed in its inner peripheral edge or vice versa. The serrations may be formed of a material which is harder than that in which the grooves are formed, the grooves being cut by the serrations during assembly of the disc onto the hub. Alternatively both the serrations and the grooves may be preformed and the serrations may be engaged within the grooves with an interference fit.

15 Claims, 4 Drawing Figures

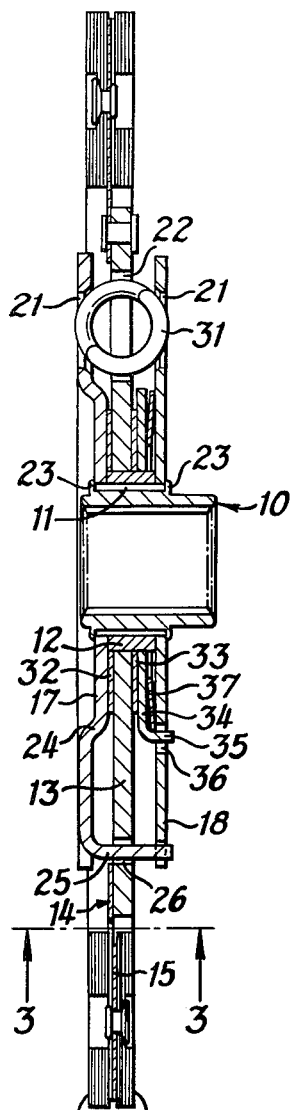
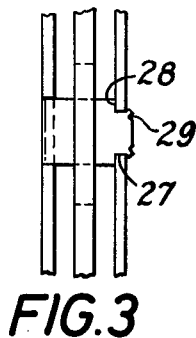
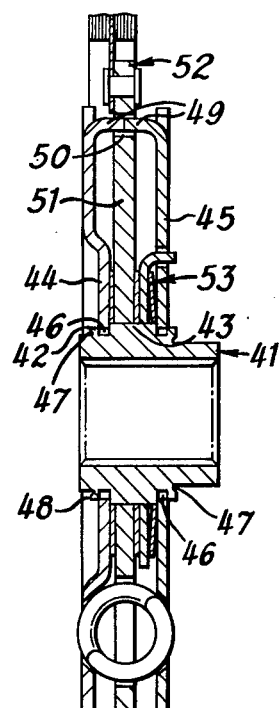
FIG.2
FIG.3
FIG.4

DRIVEN PLATES FOR FRICTION CLUTCHES

This invention relates to driven plates for friction clutches of the type in which friction facings of the driven plate to engage with the driving surfaces of the clutch are carried by an annular component mounted for limited rotational movement on a hub, resilient means being provided to oppose relative movement of the annular component and hub and tend to locate the annular component substantially at the centre of its range of rotational movement relative to the hub.

It is well known in such clutch driven plates to provide two radially extending annular disc-like members fixed in relation to the hub, a radially inner portion of the annular component, which carries the friction facings on its outer peripheral portion, extending between said disc-like members, the resilient means being coil springs mounted in registering openings in the annular component and in the disc-like members, and the relative rotational movement being limited by stops fixed to the disc-like members and engaging in circumferentially elongated slots in the annular component.

It is an object of the present invention to provide a driven clutch plate which is simple and economical to manufacture.

Another object of this invention is to provide a new and improved form of stop which is fixed to the disc-like members for engagement in circumferentially elongated slots in the annular component.

A further object of this invention is to provide a new and improved fixing arrangement for fixing at least one of the disc-like members to the hub.

A preferred form of clutch driven plate according to this invention has an annular friction facing carrier which is mounted for limited rotational movement on a hub. Two radially extending annular disc-like members are fixed in relation to the hub. The said annular friction facing carrier comprises a radially inner portion, which extends between the two disc-like members, and an outer peripheral portion which carries the friction facings. Registering openings are formed in the radially inner portion of the annular friction facing carrier and in the disc-like members and resiliently compressible members are mounted in the registering openings to oppose such limited rotational movement of the annular friction facing carrier relative to the hub. The annular disc-like members have their inner peripheral edges formed of a material which is harder than the material of that part of the hub to which they are fixed and are fixed directly and non-rotatably to the hub by engagement of serrations formed on their inner peripheral edges with corresponding grooves formed in the hub by the serrations as the disc-like members were forced axially onto the hub members during assembly of the clutch driven plate. Stops carried by at least one of the annular disc-like members and engaged in circumferentially elongated slots in the annular friction facing carrier to limit rotational movement of the annular friction facing carrier relative to the hub are constituted by bent-over tongues which are integral with the said annular disc-like member by which they are carried.

The invention will be hereinafter described with reference to the accompanying drawings, in which:

FIG. 2 is a section on the line 2—2 of FIG. 1;

FIG. 3 is a detail view in section on the line 3—3 of FIG. 2; and

FIG. 4 is a partial section similar to FIG. 2 showing a modification;

Figure 1:
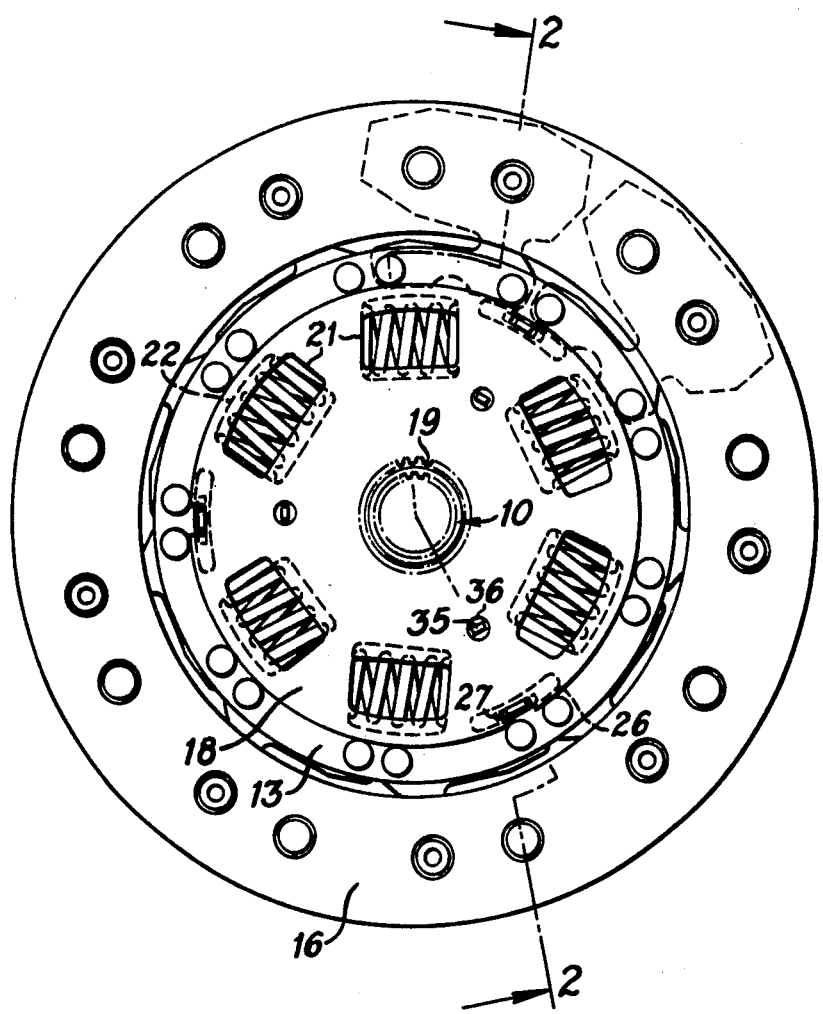
FIG. 1 is a front elevation of one form of clutch driven plate according to the invention.

Referring to FIGS. 1, 2 and 3 of the drawings, an internally splined tubular hub 10, which may be formed from a piece of metal tubing, has an externally thickened portion 11 extending over a part of its length. A spacer sleeve 12 fitted over the thickened portion 11 of the hub 10 locates, coaxially with the hub 10, a rigid annular disc 13 forming the radially inner portion of an annular friction facing carrier 14, the outer peripheral portion of which comprises a series of resilient metal cushion members 15 rivetted to the disc 13 and supporting friction facings 16 in the conventional manner.

Two annular disc-like members 17 and 18, of sheet metal, serrated at their inner peripheral edges as shown at 19 in FIG. 1, are each provided with a circular series of substantially rectangular windows 21 near their outer peripheries, corresponding windows 22, of greater radial width than the windows 21, being formed in the disc 13.

The tips of the serrations 19 at their inner peripheral edges of the disc-like members 17 and 18 lie on a circle of smaller diameter than the thickened portion 11 of the hub, and the said disc-like members 17 and 18 are formed of harder metal than the hub 10. The disc-like members 17 and 18 are secured to the hub 10, in axially spaced location, by forcing them onto the ends of the thickened portion 11 of the hub, with the spacer sleeve 12 between them, so that the serrations 19 cut grooves in the said thickened portion 11 and remain engaged in the grooves so cut, thus securing the disc-like members 17 and 18 against rotation in the hub. The said members 17 and 18 are held against the ends of the spacer sleeve 12 by staking the material of the hub 10 as shown at 23 in FIG. 2.

The disc-like member 18, as shown in FIG. 2 is flat, but the disc-like member 17 is formed with a circumferential step at 24. At its outer peripheral edge, the said disc-like member 17 is formed with a series of circumferentially spaced tongues 25 which are bent over at right angles to the plane of the member 17. The rigid annular disc 13 is formed with slots 26, wider in a circumferential direction than the tongues 25 and the said tongues 25, when the clutch driven plate is assembled, pass through the slots 26. The ends of the tongues 25, as shown in FIG. 3, are reduced in width and enter notches 27 in the annular disc-like member 18, the said member 18 being held firmly against shoulders 28 in the tongues 25 by staking the ends of the tongues at 29.

When the clutch plate is being assembled, coiled compression springs 31 are mounted in the windows 21, 22 to provide resilient resistance to relative rotational movement of the hub 10, and the friction facing carrier 14. The windows 21 and 22 in some of the groups may, as is the case in some known clutch driven plates, be of different circumferential lengths so that some of the springs 31 come into action to resist relative rotation only after some degree of relative rotation in one or both directions has taken place. The windows 21 have a radial width less than the diameter of the springs 31, so that the disc-like members 17 and 18 retain the springs in position in the windows.

Frictional damping of the relative rotational movement of the annular friction facing carrier 14 and the hub 10 may be provided, in the known manner, by mounting a first ring 32 of friction material between the inner peripheral portion of the disc-like member 17 and the rigid annular disc 13 and a second ring 33 of friction material between the other side of the rigid annular disc 13 and a pressure plate 34 held against rotation relative to the disc-like member 18 by a tongue 35 on said pressure plate 34 entering a hole 36 in the said member 18, a Belleville Washer 37 or other suitable resilient member being mounted between the pressure plate 34 and the member 18 to apply axial pressure to the pressure plate.

In the modified form of clutch driven plate according to the invention shown in FIG. 4 of the drawings, the hub 41 has an externally thickened portion 42 on which is integrally formed a circumferential rib 43 serving as a spacer between the two annular disc-like members 44 and 45, which, as in the previously described arrangement, have their inner peripheral edges serrated at 46, the said members 44 and 45 being of harder metal than the hub 41 so that, when the members 44 and 45 are forced onto the thickened portion 42 of the hub, they cut grooves therein and are non-rotatably fixed thereto. The ends of the thickened portion 42 of the hub are initially grooved at 47, the outer walls of the grooves being deformed outwardly as shown at 48 after the annular disc-like members 44 and 45 have been forced on to the hub, to hold the said members against axial movement relative to the hub.

The annular disc-like members 44 and 45 are generally similar to the corresponding members 17 and 18 shown in FIGS. 1 to 3 but, instead of one of the said members being formed with tongues at its outer peripheral edge which extend into slots in the other of said members, both members 44 and 45 are provided with bent-over tongues 49 which extend towards each other when the clutch driven plate is assembled, the ends of the said tongues contacting each other as shown in FIG. 4, and extending into circumferential slots 50 in a rigid metal disc 51 forming the inner peripheral portion of an annular friction facing carrier 52 similar to that already described. Friction damping means similar to those described with reference to FIG. 2 are shown at 53.

It will be apparent that the tongues 25 or 49 co-operate with the ends of the slots 26 or 50 in the rigid metal disc 13 or 51 to limit the relative rotational movement of the annular friction facing carrier and the hub when the springs are compressed to absorb torque fluctuations which occur particularly when the clutch is taking up the drive between the engine and the road wheels of a vehicle.

Although, in the preceding description, it has been stated that the annular disc-like members 17, 18 or 44, 45 are made of harder material than the hub and have their inner peripheral edges serrated, the hub may, if preferred, be made of harder material than the said disc-like members, the thickened portion of the hub then being serrated whilst the inner peripheral edges of the disc-like members are smooth, and the serrations on the hub cutting grooves in the said disc-like members when the parts are assembled.

Whilst it is preferred to fix both of the annular disc-like members to the hub by means of preformed serrations on one of them engaging in grooves in the other, the said grooves being cut by the serrations when the parts are assembled, only one of the said disc-like members may be fixed to the hub in that way. The other one of said disc-like members may be held against rotational movement on the hub by tongues or other connecting members between the two disc-like members at or adjacent their outer peripheries.

The hub may comprise parts each formed of one of two materials and bonded together, only the thickened portion with which the inner peripheral edges of the annular disc-like members are engaged having the desired hardness relation to said discs.

In another arrangement the interengaging serrations and grooves formed in either or both annular disc-like members are preformed and preferably are arranged so that they interengage with an interference fit. The hub may be composed of a sintered metal such as iron. The serrations on the hub may be formed by a hot or cold rolling process.

In each of the embodiments of clutch driven plate described above, the radially inner portion of the annular friction facing carrier is described and shown as a flat rigid annular disc. It should be appreciated that it is not essential for such a disc to be flat, it may be shaped to suit the configuration of a friction clutch in which it is to be fitted, for example, the outer peripheral portion may be coned.

We claim:

1. A clutch driven plate comprising an annular friction facing carrier mounted for limited rotational movement on a hub, two radially extending annular disc-like members, each annular disc-like member being fixed directly and non-rotatably to the hub, registering openings formed in said annular friction facing carrier and in said disc-like members, resiliently compressible members mounted in said registering openings to oppose said limited rotational movement, and a stop which is carried by one of said annular disc-like members and which projects into a circumferentially elongated slot in said annular friction facing carrier to limit rotational movement of said annular friction facing carrier relative to the hub, wherein the improvement comprises said stop being constituted by a bent-over tongue, which is integral with said one annular disc-like member, and locating means which are defined by the other annular disc-like member and which are engaged with a co-operating part of said tongue so as to co-act with the co-operating tongue part to resist circumferential deflection of said tongue relative to said one annular disc-like member.

2. A clutch driven plate comprising an annular friction facing carrier mounted for limited rotational movement on a hub, two radially extending annular disc-like members fixed in relation to the hub, said annular friction facing carrier comprising a radially inner portion extending between said disc-like members and an outer peripheral portion which carries the friction facings, registering openings being formed in said radially inner portion of said annular friction facing carrier and in said disc-like members and resiliently compressible members being mounted in said registering openings to oppose said limited rotational movement, a fixing arrangement fixing each of said annular disc-like members directly and non-rotatably to the hub, and stops carried by at least said one annular disc-like member and which projects into circumferentially elongated slots in said annular friction facing carrier to limit rotational movement of said annular friction facing carrier relative to the hub, wherein the improvement comprises the said stops being constited by bent-over tongues which are integral with the said annular disc-like member by which they are carried, each tongue being engaged with respective locating means which are defined by the other annular disc-like member and which co-act with the respective tongue to resist circumferential deflection of that tongue relative to said one annular disc-like member.

3. A clutch driven plate according to claim 2, wherein the improvement further comprises circumferentially elongated slots within which said bent-over tongues are engaged being formed in the radially inner portion of said annular friction facing carrier.

4. A clutch driven plate according to claim 3, wherein the improvement further comprises the outer peripheral portion of the annular 18, friction facing carrier comprising a series of resilient metal cushion members fixed individually to the radially inner portion of said annular friction facing carrier.

5. A clutch driven plate according to claim 2, wherein the improvement further comprises said bent-over tongues being secured to the other of said annular disc-like members.

6. A clutch driven plate according to claim 2, wherein the improvement further comprises both said annular disc-like members carrying such stops which comprise such bent-over tongues and which are engaged within the circumferentially elongated slots, each of said stops comprising a pair of tongues, one on each of said annular disc-like members, the ends of the tongues constituting said pair abutting each other in the space between said members.

7. A clutch driven plate comprising an annular friction fading carrier mounted for limited rotational movement on a hub, two radially extending annular disc-like members fixed in relation to the hub, said annular friction facing carrier comprising a radially inner portion extending between said disc-like members and an outer peripheral portion which carries said friction facings, registering openings being formed in said radially inner portion of said annular friction facing carrier and in said disc-like members and resiliently compressible members being mounted in said registering openings to oppose said limited rotational movement, and a fixing arrangement fixing at least one of said annular disc-like members directly and non-rotatably to the hub, wherein the improvement further comprises the said annular disc-like member having its inner peripheral edge formed of a material which differs in hardness from the material of that part of the hub to which it is fixed and the fixing arrangement comprising serrations formed on whichever one of the said inner peripheral edge of the annular disc-like member and the said hub part that is formed of the harder material, the said serrations being engaged with corresponding grooves formed in the other one of said inner peripheral edge of said annular disc-like member and said hub part by the serrations in said one annular disc-like member was forced axially on to the hub member during assembly, so that said one annular disc-like member is fixed against rotation on the hub by the engagement of the serrations in the respective grooves.

8. A clutch driven plate according to claim 7, wherein the improvement further comprises both the two annular disc-like members being fixed to the hub by fixing arrangements as set out in that Claim and being axially spaced apart by spacing means on said hub.

9. A clutch driven plate according to claim 8, wherein the improvement further comprises the spacing means comprising a spacing sleeve surrounding the hub.

10. A clutch driven plate according to claim 8, wherein the improvement further comprises the spacing means comprising a circumferential rib integral with the hub.

11. A clutch driven plate according to claim 7, wherein the improvement further comprises the annular disc-like members being of harder material than the hub.

12. A clutch driven plate according to claim 8, wherein the improvement further comprises the annular disc-like members being of harder material than the hub and the hub material being deformed on the opposite side of each annular disc-like member from said spacing means to hold that annular disc-like member against the spacing means.

13. A clutch driven plate comprising an annular friction facing carrier mounted for limited rotational movement on a hub, two radially extending annular disc-like members fixed in relation to the hub, said annular friction facing carrier comprising a radially inner portion extending between said disc-like members and an outer peripheral portion which carries the friction facings, registering openings being formed in said radially inner portion of said annular friction facing carrier and in said disc-like members and resiliently compressible members being mounted in said registering openings to oppose said limited rotational movement, a fixing arrangement fixing at least one of said annular disc-like members directly and non-rotatably to the hub, and stops carried by at least said one annular disc-like member and engaged in circumferentially elongated slots in said annular friction facing carrier to limit rotational movement of said annular friction facing carrier relative to the hub, wherein the improvement comprises the said stops being constited by bent-over tongues which are integral with the said annular disc-like member by which they are carried, said bent-over tongues having end portions of reduced width extending into slots in said other annular disc-like member and secured therein by staking.

14. A clutch driven plate comprising an annular friction facing carrier mounted for limited rotational movement on a hub, two radially extending annular disc-like members each fixed directly and non-rotatably to the hub, registering openings formed in said annular friction facing carrier and in said disc-like members, resiliently compressible members mounted in said registering openings to oppose said limited rotational movement, and a stop which is carried by one of said annular disc-like members and which extends through a circumferentially elongated slot in said annular friction facing carrier to limit rotational movement of said annular friction facing carrier relative to the hub, wherein the improvement comprises said stop being constituted by a bent-over tongue which is integral with said one annular disc-like member and which is fitted into a notch in the other annular disc-like member in such a manner that it is located against circumferential movement relative to said other annular disc-like member by said other annular disc-like member.

15. A clutch driven plate comprising an annular friction facing carrier mounted for limited rotational movement on a hub, two radially extending annular disc-like members fixed in relation to the hub, said annular friction facing carrier comprising a radially inner portion extending between said disc-like members and an outer peripheral portion which carries said friction facings, registering openings being formed in said radially inner portion of said annular friction facing carrier and in said disc-like members and resiliently compressible members being mounted in said registering openings to oppose said limited rotational movement, and a fixing arrangement fixing each of said annular disc-like members directly and non-rotatably to the hub, wherein the improvement further comprises each annular disc-like member having its inner peripheral edge formed of a material which is harder than the material of that part of the hub to which it is fixed and the fixing arrangement comprising serrations formed on the said inner peripheral edge of each annular disc-like member, the said serrations being engaged with corresponding grooves formed in said hub part by those serrations as the respective annular disc-like member was forced axially onto the hub member during assembly, so that each annular disc-like member is fixed against rotation on the hub by the engagement of the serrations in the respective grooves.

* * * * *

UNITED STATES PATENT OFFICE
CERTIFICATE OF CORRECTION

Patent No. 3,938,635            Dated February 17, 1976

Inventor(s) David Aubrey Davies et al.

It is certified that error appears in the above-identified patent and that said Letters Patent are hereby corrected as shown below:

On the cover sheet, Item (73) Assignee should read:

-- Automotive Products Ltd. --.

Signed and Sealed this

Seventh Day of March 1978

[SEAL]

Attest:

RUTH C. MASON
*Attesting Officer*

LUTRELLE F. PARKER
*Acting Commissioner of Patents and Trademarks*